(12) United States Patent
Yamamoto et al.

(10) Patent No.: US 9,341,012 B2
(45) Date of Patent: May 17, 2016

(54) WINDOW REGULATOR

(71) Applicant: SHIROKI CORPORATION, Kanagawa (JP)

(72) Inventors: Kenji Yamamoto, Kanagawa (JP); Yousuke Tsuchimoto, Kanagawa (JP)

(73) Assignee: SHIROKI CORPORATION, Kanagawa (JP)

(*) Notice: Subject to any disclaimer, the term of this patent is extended or adjusted under 35 U.S.C. 154(b) by 0 days.

(21) Appl. No.: 14/151,895

(22) Filed: Jan. 10, 2014

(65) Prior Publication Data

US 2014/0190086 A1 Jul. 10, 2014

(30) Foreign Application Priority Data

Jan. 10, 2013 (JP) .................................. 2013-002635
Jan. 10, 2013 (JP) .................................. 2013-002636

(51) Int. Cl.
*E06B 3/44* (2006.01)
*E05F 11/38* (2006.01)
(Continued)

(52) U.S. Cl.
CPC ................. *E05F 11/385* (2013.01); *B60J 1/17* (2013.01); *E05F 15/689* (2015.01); *E05F 11/488* (2013.01);
(Continued)

(58) Field of Classification Search
CPC ....... E05F 15/10; E05F 15/16; E05F 15/1669; E05F 11/382; E05F 11/385; E05F 11/481; E05F 11/483; B60J 5/0412; B60J 5/0416
USPC ........................................... 49/348, 349, 352
See application file for complete search history.

(56) References Cited

U.S. PATENT DOCUMENTS 6,088,965 A * 7/2000 Fukumoto et al. ............. 49/352
6,553,720 B2 * 4/2003 Merlet ........................... 49/440
(Continued)

FOREIGN PATENT DOCUMENTS

DE 3627234 A1 2/1988
DE 19981927 C1 7/2003
(Continued)

OTHER PUBLICATIONS

English Translation Abstract of JP 2011-144627 published Jul. 28, 2011.
(Continued)

*Primary Examiner* — Katherine Mitchell
*Assistant Examiner* — Catherine A Kelly
(74) *Attorney, Agent, or Firm* — Millen, White, Zelano & Branigan, P.C.

(57) ABSTRACT

In a window regulator, a positioner is provided between a pair of slider bases and a pair of windowpane holders and define a relative position therebetween in a forward/rearward direction of a vehicle; a vehicle-widthwise-directional wall is provided on each guide rail; and a pair of forward/rearward directional guide walls is provided on each slider base to hold an associated vehicle-widthwise-directional wall in the forward/rearward direction and to guide an associated slider base along an associated guide rail. A clearance in the forward/rearward direction between the vehicle-widthwise-directional wall of one guide rail and the forward/rearward-directional guide walls of one slider base is set smaller than that between the vehicle-widthwise-directional wall of the other guide rail and the forward/rearward-directional guide walls of the other slider base.

13 Claims, 11 Drawing Sheets

(51) Int. Cl.
*B60J 1/17* (2006.01)
*E05F 15/689* (2015.01)
*E05F 11/48* (2006.01)

(52) U.S. Cl.
CPC ...... *E05Y 2201/612* (2013.01); *E05Y 2600/312* (2013.01); *E05Y 2600/56* (2013.01); *E05Y 2800/00* (2013.01); *E05Y 2800/174* (2013.01); *E05Y 2800/40* (2013.01); *E05Y 2800/45* (2013.01); *E05Y 2900/55* (2013.01)

(56) References Cited

U.S. PATENT DOCUMENTS

| | | | |
|---|---|---|---|
| 6,598,345 | B1 | 7/2003 | Arimoto et al. |
| 6,609,334 | B1 | 8/2003 | Gutermuth |
| 7,076,918 | B2* | 7/2006 | Tatsumi et al. ................. 49/352 |
| 7,617,633 | B2* | 11/2009 | Shimura et al. ................. 49/349 |
| 8,388,044 | B2* | 3/2013 | Saito et al. ................. 296/146.2 |
| 2011/0068609 | A1 | 3/2011 | Saito et al. |
| 2013/0111816 | A1* | 5/2013 | Kinoshita ....................... 49/376 |
| 2013/0160371 | A1 | 6/2013 | Hayotte |

FOREIGN PATENT DOCUMENTS

| | | | |
|---|---|---|---|
| JP | 2011-144627 A | 7/2011 | |
| WO | 2012/028828 A1 | 3/2012 | |
| WO | WO2012028828 * | 3/2012 | ................. B60J 5/04 |

OTHER PUBLICATIONS

European Search Report dated Jun. 22, 2015 issued in corresponding EP 13196874.5 application (pp. 1-7).
English Translation Abstract of DE 3627234 A1 published Feb. 18, 1988.
English Translation Abstract of DE 19981927 C1 published Jul. 3, 2003.

\* cited by examiner

Fig. 2
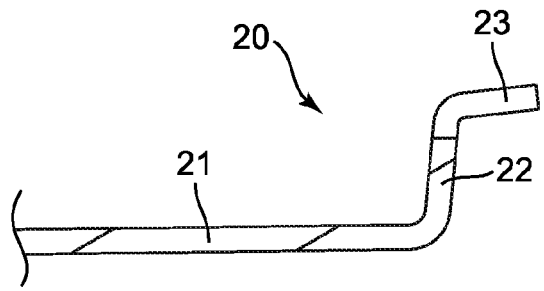
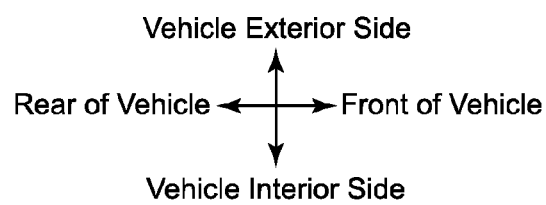
Fig. 3
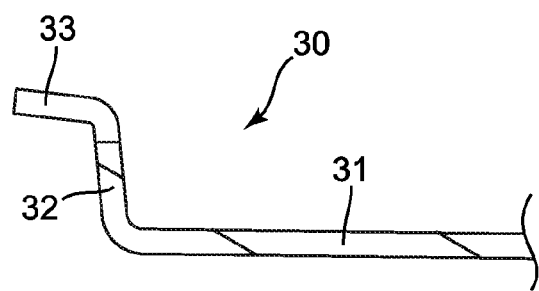
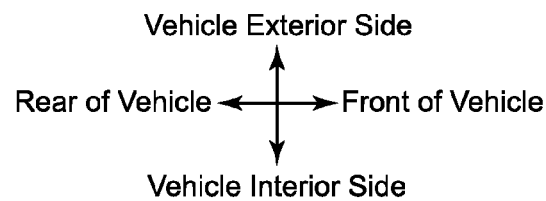

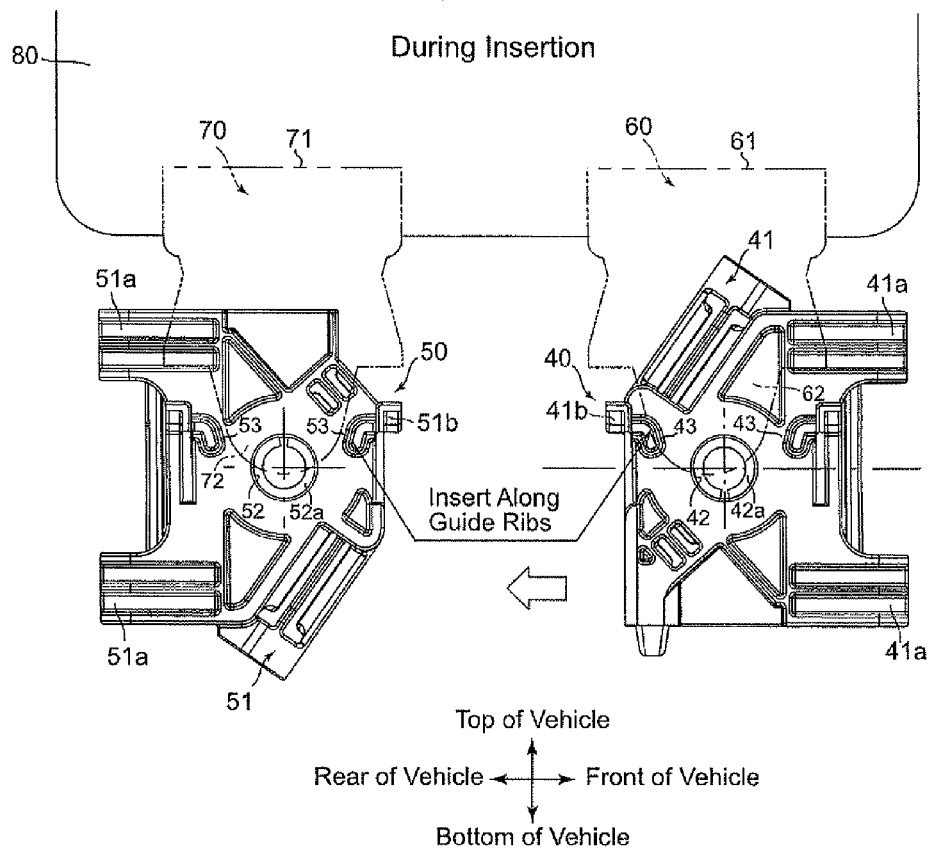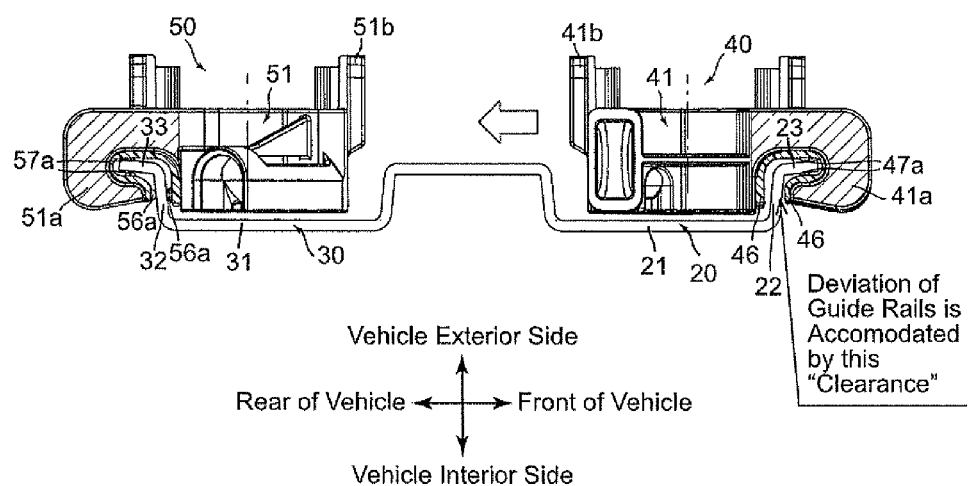

After Insertion

Top of Vehicle
Rear of Vehicle ← → Front of Vehicle
Bottom of Vehicle

Deviation in Pitch is Accomodated by this "Clearance"

Vehicle Exterior Side
Rear of Vehicle ← → Front of Vehicle
Vehicle Interior Side Fig. 13
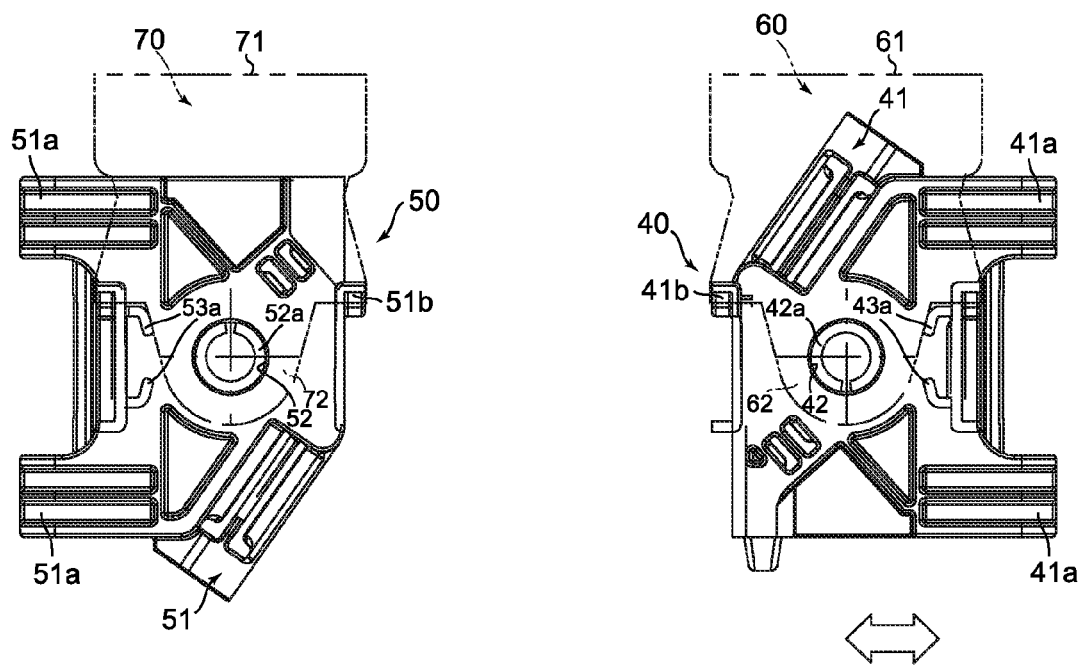
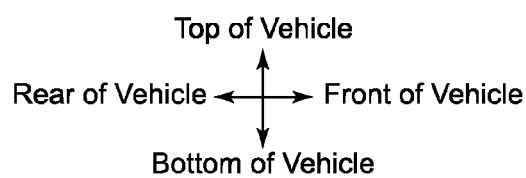

WINDOW REGULATOR

BACKGROUND OF THE INVENTION

1. Field of the Invention

The present invention relates to a window regulator for a vehicle door.

2. Description of Related Art

The basic configuration of a double-guide window regulator for a vehicle door includes: a pair of guide rails which are spaced from each other in the forward/rearward (longitudinal) direction of the vehicle and extend in the vertical direction, a pair of slider bases which are supported by the pair of guide rails to be slidably movable up and down along the pair of guide rails, and a pair of windowpane holders which are fixed to the pair of slider bases and hold a windowpane.

In Japanese Unexamined Patent Publication 2011-144627, forming an elongated hole extending in the forward/rearward direction of the vehicle in each of a front and rear pair of slider bases, forming a circular hole in each of the pair of windowpane holders and fastening each slider base and the associated windowpane holder to each other using a fastening member (e.g., a bolt or a pin) through the elongated hole and the circular hole thereof with one of these holes on top of the other are disclosed as a structure for fixing the pair of windowpane holders to the pair of slider bases. Forming the hole in each slider base as an elongated hole extending in the forward/rearward direction of the vehicle makes it possible to adjust the relative position between each slider base and the associated windowpane holder in the forward/rearward direction of the vehicle to thereby accommodate deviations (difference) in pitch (distance) (compensate pitch tolerance) between the pair of slider bases and the pair of windowpane holders in the forward/rearward direction of the vehicle.

Theoretically, it is sufficient to form the aforementioned elongated hole in one of the front and rear pair of slide bases. However, in the above-mentioned Japanese Unexamined Patent Publication 2011-144627, each slider base is provided with the elongated hole to make the pair of slider bases mutually identical in shape. This structure causes an increase in size of the pair of slider bases and requires as a large work space because each slider base and the associated windowpane holder to each other are fastened together using a fastening member (e.g., a bolt or a pin) through the elongated hole and the circular hole thereof with one of these holes aligned with the other. Additionally, collars into which fastening bolts or pins are inserted are each required to be formed into an elongated shape corresponding to the associated elongated hole, which is disadvantageous with regard to both weight and cost. However, it is common general technical knowledge that the fastening hole of each slider base into which a fastening member is inserted is made as an elongated hole to accommodate deviations in pitch between the pair of slider bases and the pair of windowpane holders in the forward/rearward direction of the vehicle, and no other structures to accommodate the deviations in pitch are known in the art. This is the first technical problem to be solved for window regulators having known structure.

On the other hand, in recent years, a double-guide window regulator adopting a resin panel which includes a resin panel on which a pair of guide rails spaced from each other in the forward/rearward direction of the vehicle and extending in the vertical direction are integrally formed; and a pair of slider bases to which a windowpane is fixed and which are supported by the pair of guide rails of the resin panel to be freely slidably movable up and down along the pair of guide rails, has become known in the art. In this type of window regulator, pulleys positioned at the upper and lower ends of each guide rail and a motor assembly positioned at a midpoint between these pulleys are supported on the resin panel in advance to be provided as a sub-assembly to achieve a reduction in number of elements, a reduction in weight and an increase in strength. When the resin panel is mounted to a vehicle door, the pulleys (the resin panel) are mounted to a vehicle door panel (inner panel) by fastening bolts which are inserted into the shaft holes of the pulleys, and a windowpane is fixed to the pair of slider bases.

In this type of double-guide window regulator adopting a resin panel, it has been common general technical knowledge that the pair of slide bases hold the pair of guide rails with no clearance therebetween in the forward/rearward direction of the vehicle (e.g., the pair of slide bases hold the pair of guide rails with guide projections which are formed on the pair of slider bases to come in pressing contact with the pair of guide rails being slightly resiliently deformed).

However, when the pair of guide rails do not have sufficient parallelism due to a low precision of the shape of the resin panel at the time of production thereof or due to thermal expansion or contraction of the resin panel, the surface pressures (sliding loads) at the contact portions between the pair of guide rails and the pair of slider bases increase, which becomes a cause of malfunctioning of the window regulator or noise. If the pair of slider bases are made of resin in particular, the resin materials (the pair of guide rails and the pair of slider bases) move while sliding on each other, which easily causes the problem of malfunctioning or noise to occur. This is a second technical problem that needs to be solved in window regulators having a known structure.

SUMMARY OF THE INVENTION

The present invention has been devised in view of the aforementioned first technical problem to be solved for window regulators having a known structure and provides a window regulator which does not require to form an elongated hole in either the pair of slider bases or the pair of windowpane holders, which achieves miniaturization of the pair of slider bases, which reduces the work space for fixing (fastening) the pair of windowpane holders to the pair of slider bases, and which is advantageous in regard to both weight and production cost.

In addition, the present invention has been devised in view of the aforementioned second technical problem to be solved for window regulators having known structure and provides a window regulator which makes it possible to uniformly define the raising and lowering path of the pair of slider bases (windowpane) and to prevent the window regulator from causing malfunctioning and noise even when the pair of guide rails of the resin panel do not have sufficient parallelism.

After reviewing the common general technical knowledge of providing, between the pair of slider bases and the pair of windowpane holders, a pitch absorber which accommodates deviations in pitch therebetween in the forward/rearward direction of the vehicle, the window regulator according to an aspect of the present invention has been completed based on the technical idea of providing (between a combination of each slider base and the associated windowpane holder and the associated guide rail) a pitch accommodator which accommodates deviations in pitch between the slider base and the windowpane holder in the forward/rearward direction of the vehicle.

According to a first aspect of the present invention, a window regulator is provided, including a pair of guide rails which are spaced from each other in a forward/rearward direction of a vehicle and extend in a vertical direction; a pair of slider bases which are supported by the pair of guide rails to be movable up and down along the pair of guide rails, respectively; a pair of windowpane holders which are fixed to the pair of slider bases, respectively, and hold a windowpane; a positioner which is provided between the pair of slider bases and the pair of windowpane holders, wherein the positioner defines a relative position between the pair of slider bases and the pair of windowpane holders in the forward/rearward direction; a vehicle-widthwise-directional wall which is formed on each of the pair of guide rails and extends in a widthwise direction of the vehicle; and a pair of forward/rearward directional guide walls which are formed on each of the pair of slider bases to hold an associated the vehicle-widthwise-directional wall therebetween in the forward/rearward direction and to guide an associated slider base of the pair of slider bases along an associated guide rail of the pair of guide rails. A clearance in the forward/rearward direction between the vehicle-widthwise-directional wall of one of the pair of guide rails and the pair of forward/rearward-directional guide walls of one of the pair of slider bases which is associated with the one of the pair of guide rails is set smaller than a clearance in the forward/rearward direction between the vehicle-widthwise-directional wall of the other of the pair of guide rails and the pair of forward/rearward-directional guide walls of the other of the pair of slider bases.

Accordingly, the position, with respect to the forward/rearward direction of the vehicle, of a combination of one of the pair of slider bases and corresponding one of the pair of windowpane holders is defined by the sliding portions between the vehicle-widthwise-directional wall of one of the pair of guide rails and the pair of forward/rearward directional guide walls of associated one of the pair of slider bases, which are small in clearance therebetween in the forward/rearward direction of the vehicle, and the position, with respect to the forward/rearward direction of the vehicle, of a combination of the other slider base and the other windowpane holder can be adjusted at the sliding portions between the vehicle-widthwise-directional wall of the other guide rail and the pair of forward/rearward directional guide walls of the other slider base, which are great in clearance therebetween in the forward/rearward direction of the vehicle, thereby accommodating deviations in pitch (compensating pitch tolerance) between the pair of slider bases and the pair of windowpane holders in the forward/rearward direction of the vehicle, so that the installation operation of the windowpane becomes easy to perform and the raising and lowering operations of the windowpane can be smoothly performed.

In the present specification, the term "clearance in the forward/rearward direction of the vehicle" also includes the concept of zero clearance existing in the forward/rearward direction of the vehicle. In other words, a state in which the clearance is zero refers to the vehicle-widthwise-directional wall of the aforementioned one guide rail and the pair of forward/rearward directional guide walls of the aforementioned one slider base being in contact with each other in the forward/rearward direction of the vehicle.

In the window regulator of the present invention, the positioner can include a guide portion which is formed on each the pair of slider bases, and the guide portions of the pair of slider bases can receive the pair of windowpane holders, respectively, to define the relative position between the pair of slider bases and the pair of windowpane holders in the forward/rearward direction.

Accordingly, simply by making the guide portion of each slider base receive the associated windowpane holder, the relative position between the pair of slider bases and the pair of windowpane holders in the forward/rearward direction of the vehicle can be defined without the need for fine adjustment to be visually carried out by an operator.

In the window regulator of the present invention, each of the pair of slider bases and associated one of the pair of windowpane holders can be fixed to each other by a fixer, wherein the fixer includes a first through-hole which is round in shape and is formed through the each of the pair of slider bases, a second through-hole which is round in shape, has the same diameter as that of said first through-hole, and is formed through the associated one of the pair of windowpane holders, and a fastening member which is inserted into the first through-hole and the second through-hole to fasten the each of the pair of slider bases and the associated one of the pair of windowpane holders to each other.

Accordingly, the fastening holes formed in the pair of slider bases and the pair of windowpane holders can be circular in shape and mutually identical in diameter and do not have to be formed into elongated holes, which makes it possible to achieve miniaturization of the pair of slider bases and reduce the work space for fixing (fastening) the pair of windowpane holders to the pair of slider bases, so that the window regulator can be made advantageous in regard to both weight and production cost. In addition, each slider base and the associated windowpane holder can be easily fixed to each other simply by inserting a fastening member (e.g., a bolt or a pin) into the through-holes (fastening holes; that are circular in shape and mutually identical in diameter) of the slider and the windowpane holder and tightening the fastening member.

The term "through-holes which are circular in shape and mutually identical in diameter" in the present specification is expressed in consideration of the fact that the through-holes formed in the pair of slider bases and the pair of windowpane holders cannot be precisely perfectly either circular or mutually identical in diameter due to various conditions such as manufacturing errors. Namely, the term "through-holes which are circular in shape and mutually identical in diameter" in the present specification is used to mean "through-holes which are substantially circular in shape and substantially mutually identical in diameter" that could accommodate the range of such errors.

Each the pair of windowpane holders includes a wedge-shaped portion which narrows in width in the forward/rearward direction of the vehicle in a downward direction, the second through-hole being formed through the wedge-shaped portion, and each of the guide portions includes at least two guide ribs which hold the wedge-shaped portion of associated one of the pair of windowpane holders from both sides thereof in the forward/rearward direction.

Accordingly, the relative position between the pair of slider bases and the pair of windowpane holders in the forward/rearward direction of the vehicle can be defined more easily and securely.

It is desirable for the positioner to be formed on each the pair of slider bases, and for the positioner that is formed on each the pair of slider bases to be two positioners which are formed so that each the pair of slider bases is vertically reversible to be used on either of the pair of guide rails Accordingly, the relative position between each slider base and the associated windowpane holder in the forward/rearward direction of the vehicle can be defined, and slider bases having an identical structure can be manufactured at low cost.

It is desirable for the window regulator to include a forward/rearward directional wall which is formed on each of the pair of guide rails and is continuous with an end of the vehicle-widthwise-directional wall thereof on a vehicle exterior side and extends in the forward/rearward direction; and a pair of vehicle-widthwise-directional guide walls which are formed on each of the pair of slider bases to hold an associated the forward/rearward directional wall therebetween in the widthwise direction and to guide an associated slider base of the pair of slider bases along an associated guide rail of the pair of guide rails. A clearance in the forward/rearward direction between the vehicle-widthwise-directional wall of the other of the pair of guide rails and the pair of forward/rearward-directional guide walls of the other of the pair of slider bases is set greater than either of a clearance in the widthwise direction between the forward/rearward directional wall of the one of the pair of guide rails and the pair of vehicle-widthwise-directional guide walls of the one of the pair of slider bases and a clearance in the widthwise direction between the forward/rearward directional wall of the other of the pair of guide rails and the pair of vehicle-widthwise-directional guide walls of the other of the pair of slider bases.

Accordingly, the clearance in the forward/rearward direction of the vehicle between the vehicle-widthwise-directional wall of the other of the pair of guide rails and the pair of forward/rearward-directional guide walls of the other of the pair of slider bases is set greater than either of the following two clearances: the clearance in the widthwise direction between the forward/rearward directional wall of the aforementioned one of the pair of guide rails and the pair of vehicle-widthwise-directional guide walls of the aforementioned one of the pair of slider bases and the clearance in the widthwise direction between the forward/rearward directional wall of the aforementioned other of the pair of guide rails and the pair of vehicle-widthwise-directional guide walls of the aforementioned other of the pair of slider bases. This makes it possible to uniformly define the raising and lowering path of the pair of slider bases (the windowpane) by minimizing the clearance allowing the forward/rearward-directional wall of each guide rail and the pair of vehicle-widthwise-directional guide walls of the associated slider base (which are not influenced by parallelism of the pair of guide rails) to slide on each other, and also makes it possible to eliminate the surface pressures (sliding loads) at the sliding portions between the vehicle-widthwise-directional wall of the aforementioned other guide rail and the pair of forward/rearward-directional guide walls of the aforementioned other slider base to thereby prevent the sliding portions therebetween from causing malfunctioning and noise thereat.

In the present specification, the term "clearance in the widthwise direction of the vehicle" also includes the concept of zero clearance existing in the widthwise direction of the vehicle. In other words, a state of the clearance being zero refers to the forward/rearward-directional wall of each guide rail and the pair of vehicle-widthwise-directional guide walls of the associated slider base being in contact with each other in the widthwise direction of the vehicle.

It is desirable for the pair of guide rails to be formed integral with a panel made of resin.

Accordingly, the raising and lowering path of the pair of slider bases (the windowpane) can be uniformly defined by the sliding portions between the vehicle-widthwise-directional wall of the aforementioned one of the pair of guide rails and the pair of guide walls of the aforementioned one of the pair of slider bases, which are small in clearance therebetween in the forward/rearward direction of the vehicle, and the surface pressures (sliding loads) at the sliding portions between the vehicle-widthwise-directional wall of the aforementioned other rail and the pair of forward/rearward directional guide walls of the aforementioned other slider base, which are great in clearance therebetween in the forward/rearward direction of the vehicle, can be eliminated to thereby prevent the sliding portions therebetween from causing malfunctioning and noise thereat even when the pair of guide rails of the resin panel do not have sufficient parallelism.

At least part of each of the pair of slider bases which respectively slide on the pair of guide rails can be made of resin.

Accordingly, a reduction in production cost of the slider bases can be achieved.

The present disclosure relates to subject matter contained in Japanese Patent Application No. 2013-2635 (filed on Jan. 10, 2013) and No. 2013-2636 (filed on Jan. 10, 2013) which are expressly incorporated herein by reference in their entireties.

BRIEF DESCRIPTION OF THE DRAWINGS

The present invention will be discussed below in detail with reference to the accompanying drawings, in which:

FIG. 2 is a cross sectional view taken along the line II-II shown in FIG. 1, showing the structure of the vehicle-front-side guide rail (the other of the pair of guide rails) of the window regulator;

FIG. 3 is a cross sectional view taken along the line III-III shown in FIG. 1, showing the structure of the vehicle-rear-side guide rail (one of the pair of guide rails) of the window regulator;

FIG. 11A is a second schematic plan-view, including partial cross sections, diagram for illustrating the method of fixing the pair of windowpane holders that holds the windowpane to the pair of slider bases;

FIG. 11B is a second schematic side-view, including partial cross sections, for illustrating the method of fixing the pair of windowpane holders that holds the windowpane to the pair of slider bases;

FIG. 13 is a diagram illustrating another embodiment for defining the relative position between the pair of slider bases and the pair of windowpane holders in the forward/rearward direction of the vehicle;

DESCRIPTION OF THE EMBODIMENTS

Figure 1:
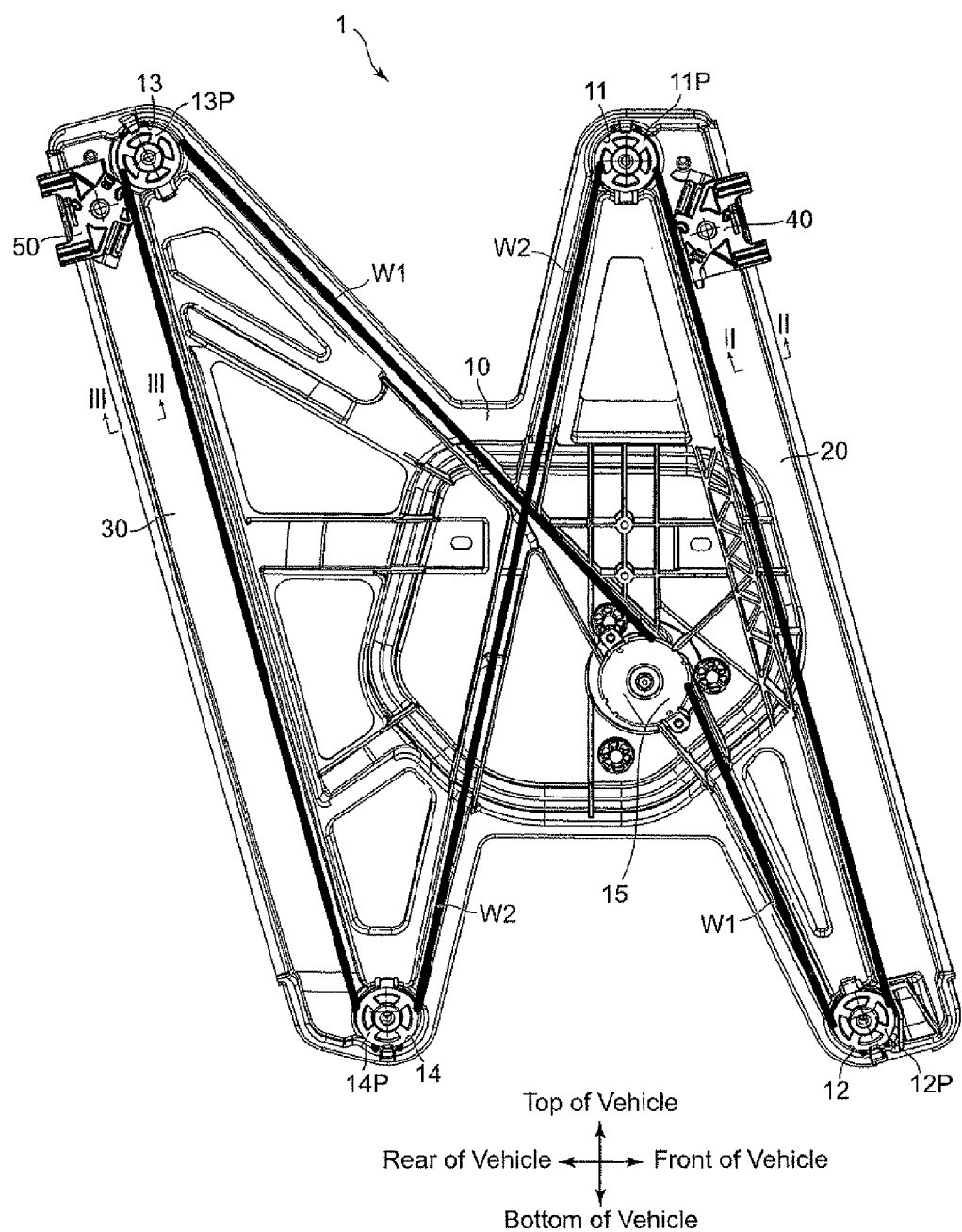
FIG. 1 is a plan view of a window regulator, designed for a vehicle door, according to the present invention, viewed from the exterior side of the vehicle.

A window regulator 1 according to the present invention will be hereinafter discussed with reference to FIGS. 1 through 12. Directions described in the following description are defined based on the directions of arrows shown in the drawings. Additionally, in the following description, the present invention will be discussed by illustrating an example in which the window regulator 1 according to the present invention is incorporated in the front right door of a vehicle.

As shown in FIG. 1, the window regulator 1 is provided with a unitarily formed resin panel 10 which is H-shaped, as viewed macroscopically in the widthwise direction of the vehicle (from the vehicle exterior side or the vehicle interior side). The resin panel 10 is integrally provided with a pair of guide rails 20 and 30 (a vehicle-front-side guide rail 20 and a vehicle-rear-side guide rail 30) which are spaced from each other in the forward/rearward direction of the vehicle and extend substantially in the vertical direction. The window regulator 1 is provided on the pair of guide rails 20 and 30 with a pair of slider bases 40 and 50, respectively, to which a windowpane 80 (see FIGS. 10A through 12B) is fixed. Although only one slider 40 and only one slider base 50 are provided in the window regulator 1, in FIG. 1 the slider bases 40 and 50 are simultaneously shown at the top dead points (at which the windowpane 80 (see FIGS. 10A through 12B) is fully closed), at the bottom dead points (at which the windowpane 80 is fully open), and at intermediate points (at which the windowpane 80 is open halfway) for the purpose of illustration. The pair of slider bases 40 and 50 are supported by the pair of guide rails 20 and 30 to be capable of being slidably movable up and down on the pair of guide rails 20 and 30, respectively.

Fit-in recessed portions 11, 12, 13 and 14 are formed integral with the resin panel 10 so that the fit-in recessed portions 11 and 12 are positioned at the upper and lower ends of the guide rail 20, respectively, and so that the fit-in recessed portions 13 and 14 are positioned at the upper and lower ends of the guide rail 30, respectively. Pulleys (wire guide members) 11P, 12P, 13P and 14P are rotatably fitted into the fit-in recessed portions 11, 12, 13 and 14, respectively. The fit-in recessed portions 11, 12, 13 and 14 are mutually identical in structure and the pulleys 11P, 12P, 13P and 14P are mutually identical in structure. To eliminate friction between the resin panel 10 (the fit-in recessed portions 11, 12, 13 and 14) and each pulley 11P, 12P, 13P and 14P to ensure rotational flexibility thereof, each pulley 11P, 12P, 13P and 14P is configured of a pulley assembly including a pulley body and a pulley bracket which rotatably supports the pulley body (the structure of this pulley assembly is not shown in the drawings).

The window regulator 1 is provided with a drive drum 15 and a motor unit (not shown) which are supported by the resin panel 10 at a central part thereof (at an intermediate portion thereof between the pulleys 11P, 12P, 13P and 14P). The motor unit drives the drive drum 15 so that it rotates in the forward and reverse directions. A drive wire W1 is wound around the drive drum 15. The drive wire W1 is connected at one end thereof to the slider base 40 after changing direction at the pulley 12P, while the drive wire W1 is connected at the other end thereof to the slider base 50 after changing direction at the pulley 13P. In addition, the slider base 40 and the slider base 50 are connected to each other via a drive wire W2 (a separate member from the drive wire W1) which changes in direction by the pulleys 11P and 14P thereat. Accordingly, driving the drive drum 15 by the motor unit (not shown) so that the drive drum 15 rotates forward and reverse causes the pair of slider bases 40 and 50 to move up and down while being guided by the pair of guide rails 20 and 30, respectively. As shown in FIG. 1, the window regulator 1 is built into a vehicle door (front right door).

As shown in FIG. 2, the guide rail 20 is continuously provided with a slider base support wall 21, a vehicle-widthwise-directional wall 22 and a forward/rearward directional wall (vehicle-longitudinal-directional wall) 23 which are uniform in cross section. The slider base support wall 21 extends in the forward/rearward direction of the vehicle, the vehicle-widthwise-directional wall 22 projects toward the exterior side of the vehicle from the end of the slider base support wall 21 on the front side of the vehicle and extends substantially in the widthwise direction of the vehicle, and the forward/rearward directional wall 23 projects toward the front of the vehicle from the end of the vehicle-widthwise-directional wall 22 on the vehicle exterior side and extends substantially in the forward/rearward direction of the vehicle.

As shown in FIG. 3, the guide rail 30 is continuously provided with a slider base support wall 31, a vehicle-widthwise-directional wall 32 and a forward/rearward directional wall (vehicle-longitudinal-directional wall) 33 which are uniform in cross section. The slider base support wall 31 extends in the forward/rearward direction of the vehicle, the vehicle-widthwise-directional wall 32 projects toward the exterior side of the vehicle from the end of the slider base support wall 31 on the rear side of the vehicle and extends substantially in the widthwise direction of the vehicle, and the forward/rearward directional wall 33 projects toward the rear of the vehicle from the end of the vehicle-widthwise-directional wall 32 on the vehicle exterior side and extends substantially in the forward/rearward direction of the vehicle.

Figure 4:
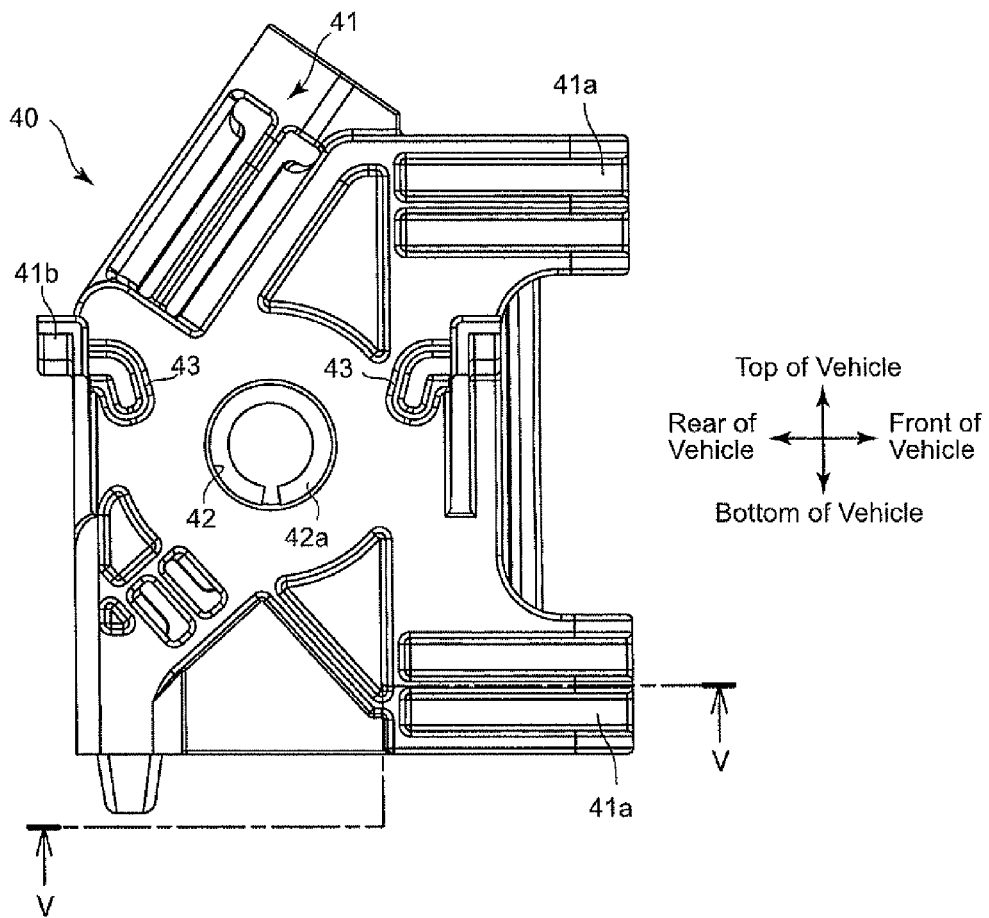
FIG. 4 is an enlarged plan view of the vehicle-front-side slider base (the other of the pair of slide bases) of the window regulator, showing the structure thereof.
Figure 5:
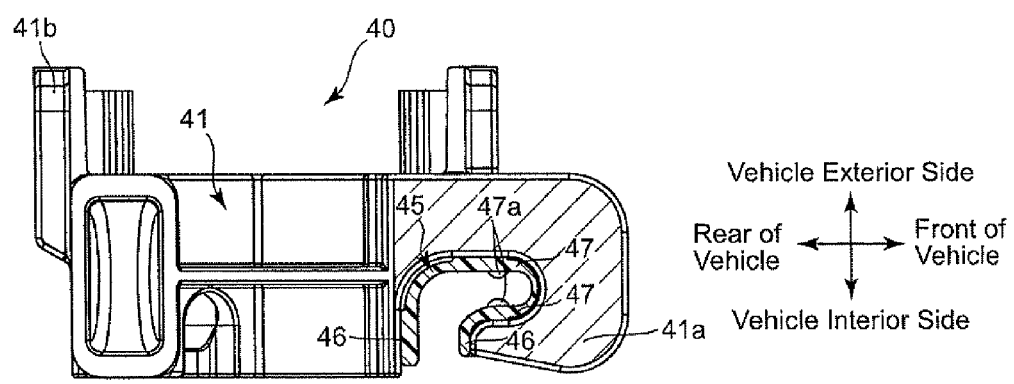
FIG. 5 is a side elevation including a partial cross sectional view taken along the line V-V line shown in FIG. 4, showing the structure thereof.

As shown in FIGS. 4 and 5, the slider base 40 is provided with a slider body 41 made of, e.g., a relatively hard material such as nylon resin containing glass fibers. The slider body 41 is provided, at the end thereof on the front side of the vehicle, with a pair of hook-shaped arms 41a which are spaced from each other in the vertical direction of the vehicle, and a shoe member 45 made of a relatively soft resin material such as a polyacetal resin is fitted into each hook-shaped arm 41a. The slider body 41 is provided, at the end thereof on the rear side of the vehicle, with a wire fixing portion 41b to which one end of the drive wire W1 and one end of the drive wire W2 are fixed. The slider body 41 is provided at a center thereof with a circular (substantially circular) through-hole (fixer) (first through-hole) 42, and a collar 42a having a substantially cylindrical shape (having a C-shape in cross section) is fitted into the circular through-hole 42. The slider body 41 is provided, slightly above the through-hole 42 on opposite sides of the through-hole 42 in the forward/rearward direction of the vehicle, with a pair of guide ribs (positioner/guide portion) 43.

Figure 8A:
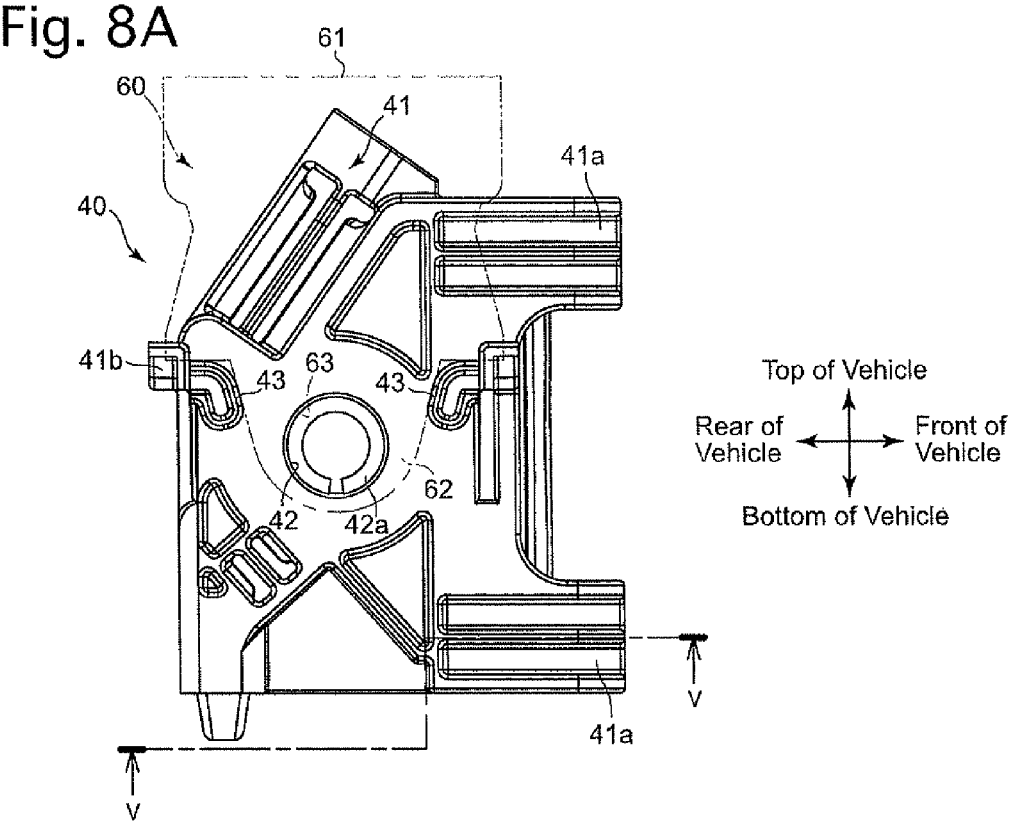
FIG. 8A is a diagram illustrating a state where a windowpane holder is fixed to the vehicle-front-side slider base (the other of the pair of slider bases) of the window regulator.

As shown in FIG. 8A, a windowpane holder 60 (shown by a two-dot chain line) which holds the windowpane 80 (see FIGS. 10A through 12B) is fixed to the slider base 40. A windowpane fixing portion 61 is formed on the windowpane holder 60 at the upper end thereof, and a substantially wedge-shaped portion (positioner) 62 which narrows in width (width in the forward/rearward direction of the vehicle) in the downward direction is formed on the windowpane holder 60 at the lower end thereof. A through-hole (fixer) (second through-hole) 63 which is circular (substantially circular) in cross-sectional shape and identical (substantially identical) in diameter to the through-hole 42 of the slider base 40 is formed through the wedge-shaped portion 62 at the center thereof. Inserting the wedge-shaped portion 62 in between the pair of guide ribs 43 of the slider base 40, so that the pair of guide ribs 43 holds the wedge-shaped portion 62 from both sides thereof in the forward/rearward direction of the vehicle, defines the relative position between the slider base 40 and the windowpane holder 60 in the forward/rearward direction of the vehicle with the through-holes 42 and 63 (which are circular in shape and mutually identical in diameter) being coaxially aligned. Additionally, in this state where this relative position has been defined, the slider base 40 and the windowpane holder 60 are fixed to each other by a fastening member (fixer) not shown in the drawings, e.g., a combination of a bolt and a nut, wherein the bolt is inserted into the through-holes 42 and 63 (specifically into the collar 42a that is fitted into the through-holes 42 and 63) and thereafter the nut is screwed onto the bolt.

As shown in FIG. 5, each shoe 45 is continuously provided with a pair of guide walls (forward/rearward directional guide walls) 46 and a pair of guide walls (vehicle-widthwise-directional guide walls) 47. In order to guide the slider base 40 along the guide rail 20, the pair of guide walls 46 hold the vehicle-widthwise-directional wall 22 of the guide rail 20 therebetween in the forward/rearward direction of the vehicle and the pair of guide walls 47 hold the forward/rearward directional wall 23 of the guide rail 20 therebetween in the widthwise direction of the vehicle. The pair of guide walls 47 are provided with a pair of guide projections 47a, respectively, which project in directions to approach each other in the widthwise direction of the vehicle.

Figure 6:
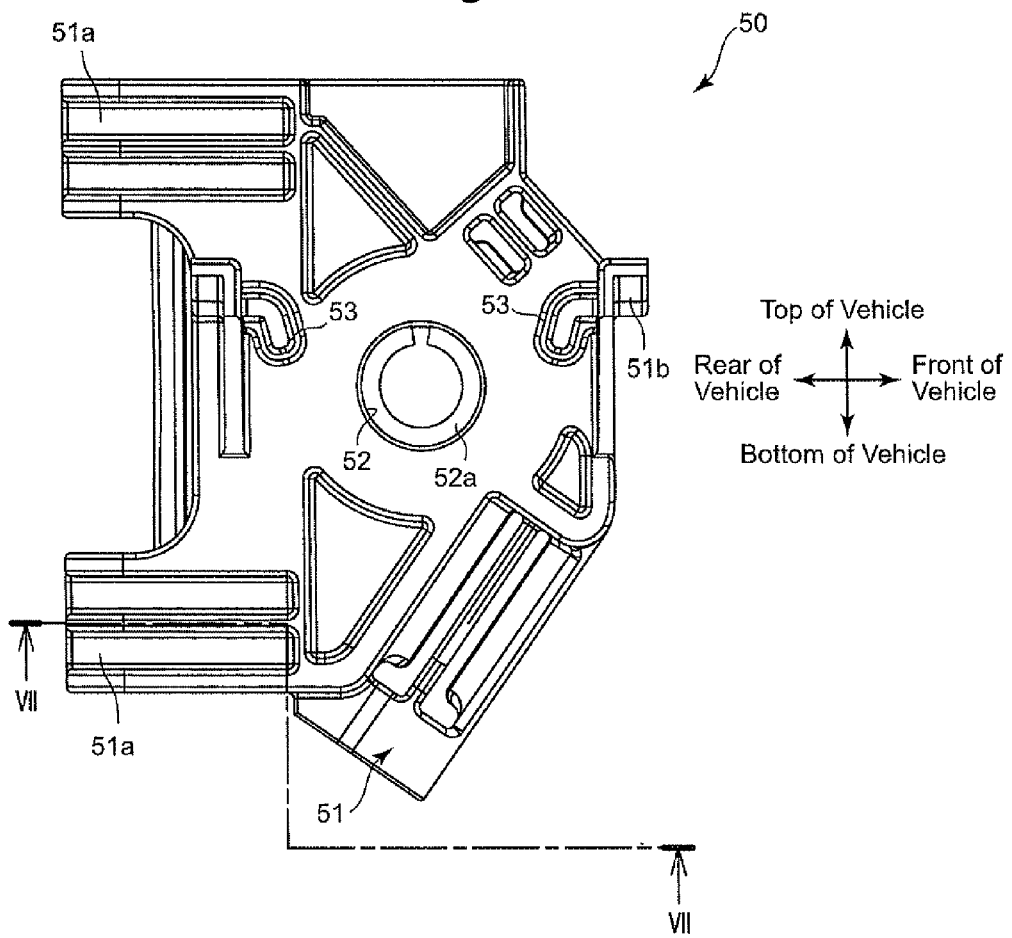
FIG. 6 is an enlarged plan view of the vehicle-rear-side slider base (one of the pair of slide bases) of the window regulator, showing the structure thereof.
Figure 7:
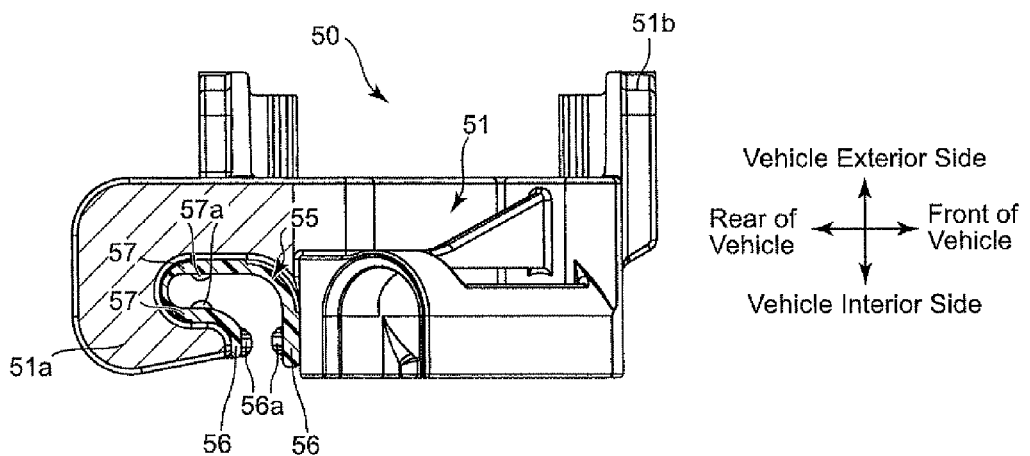
FIG. 7 is a side elevation including a partial cross sectional view taken along the line VII-VII line shown in FIG. 6.

As shown in FIGS. 6 and 7, the slider base 50 is provided with a slider body 51 made of, e.g., a relatively hard material such as nylon resin containing glass fibers. The slider body 51 is provided, at the end thereof on the rear side of the vehicle, with a pair of hook-shaped arms 51a which are spaced from each other in the vertical direction of the vehicle, and a shoe member 55 made of a relatively soft resin material such as a polyacetal resin is fitted into each hook-shaped arm 51a. The slider body 51 is provided, at the end thereof on the front side of the vehicle, with a wire fixing portion 51b to which the other end of the drive wire W1 and the other end of the drive wire W2 are fixed. The slider body 51 is provided at a center thereof with a circular (substantially circular) through-hole (fixer) (first through-hole) 52, and a collar 52a having a substantially cylindrical shape (having a C-shape in cross section) is fitted into the circular through-hole 52. The slider body 51 is provided, slightly above the through-hole 52 on opposite sides of the through-hole 52 in the forward/rearward direction of the vehicle, with a pair of guide ribs (positioner/guide portion) 53.

Figure 8B:
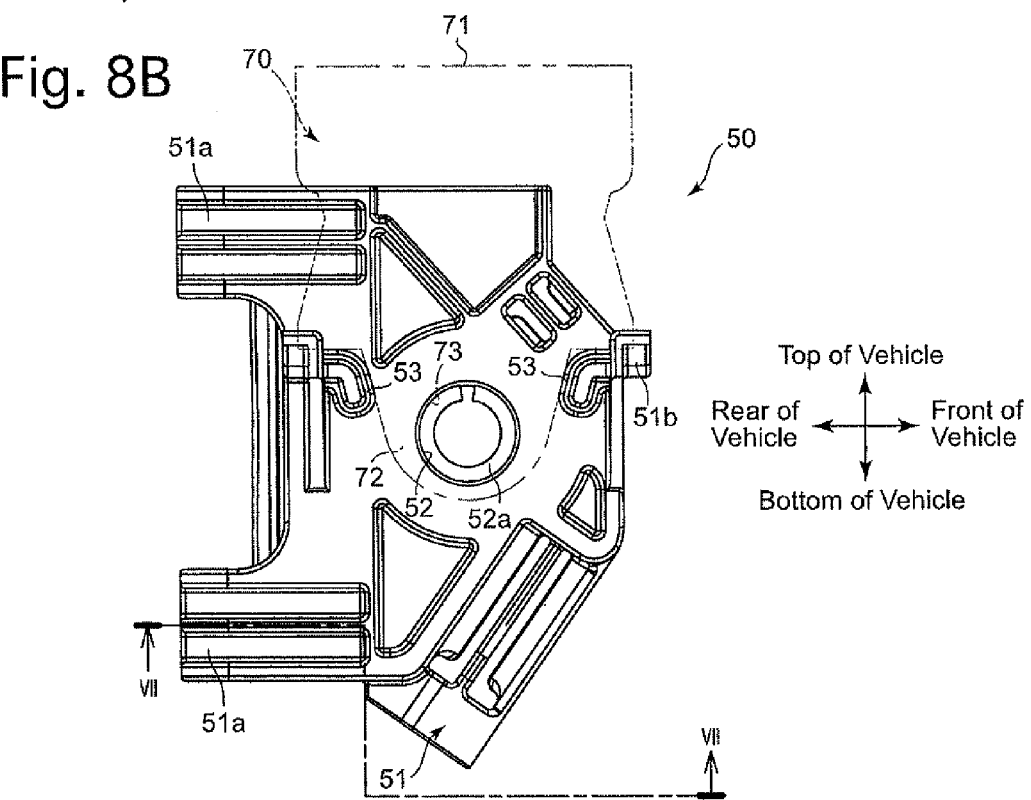
FIG. 8B is a diagram illustrating a state where a windowpane holder is fixed to the vehicle-rear-side slider base (one of the pair of slider bases) of the window regulator.

As shown in FIG. 8B, a windowpane holder 70 (shown by a two-dot chain line) which holds the windowpane 80 (see FIGS. 10 through 12) is fixed to the slider base 50. A windowpane fixing portion 71 is formed on the windowpane holder 70 at the upper end thereof, and a substantially wedge-shaped portion (positioner) 72 which narrows in width (width in the forward/rearward direction of the vehicle) in the downward direction is formed on the windowpane holder 70 at the lower end thereof. A through-hole (fixer) (second through-hole) 73 which is circular (substantially circular) in cross-sectional shape and identical (substantially identical) in diameter to the through-hole 52 of the slider base 50 is formed through the wedge-shaped portion 72 at the center thereof. Inserting the wedge-shaped portion 72 in between the pair of guide ribs 53 so that the pair of guide ribs 53 holds the wedge-shaped portion 72 from both sides thereof in the forward/rearward direction of the vehicle defines the relative position between the slider base 50 and the windowpane holder 70 in the forward/rearward direction of the vehicle with the through-holes 52 and 73 (which are circular in shape and mutually identical in diameter) being coaxially aligned. Additionally, in this state where the relative position between the slider base 50 and the windowpane holder 70 has been defined, the slider base 50 and the windowpane holder 70 are fixed to each other by a fastening member (fixer) not shown in the drawings, e.g., a combination of a bolt and a nut, wherein the bolt is inserted into the through-holes 52 and 73 (specifically into the collar 52a that is fitted into the through-holes 52 and 73) and thereafter the nut is screwed onto the bolt.

As shown in FIG. 7, each shoe 55 is continuously provided with a pair of guide walls (forward/rearward directional guide walls) 56 and a pair of guide walls (vehicle-widthwise-directional guide walls) 57. In order to guide the slider base 50 along the guide rail 30, the pair of guide walls 56 hold the vehicle-widthwise-directional wall 32 of the guide rail 30 therebetween in the forward/rearward direction of the vehicle and the pair of guide walls 57 hold the forward/rearward directional wall 33 of the guide rail 30 therebetween in the widthwise direction of the vehicle. The pair of guide walls 56 are provided with a pair of guide projections 56a, respectively, which project in directions to approach each other in the forward/rearward direction of the vehicle. The pair of guide walls 57 are provided with a pair of guide projections 57a, respectively, which project in directions to approach each other in the widthwise direction of the vehicle.

The support structure for the pair of slider bases 40 and 50 on the pair of guide rails 20 and 30 will be hereinafter discussed with reference to FIGS. 9A and 9B. The guide rail 20 and the slider base 40 are elements of the window regulator 1 which correspond to "the other guide rail (said other guide rail)" and "the other slider base (said other slider base)" which are stated in the claims of the present invention, respectively, and the guide rail 30 and the slider base 50 are elements of the window regulator 1 which correspond to "one of said pair of guide rails (said one guide rail)" and "one of said pair of slider bases (said one slider base)" which are stated in the claims of the present invention, respectively.

Figure 9A:
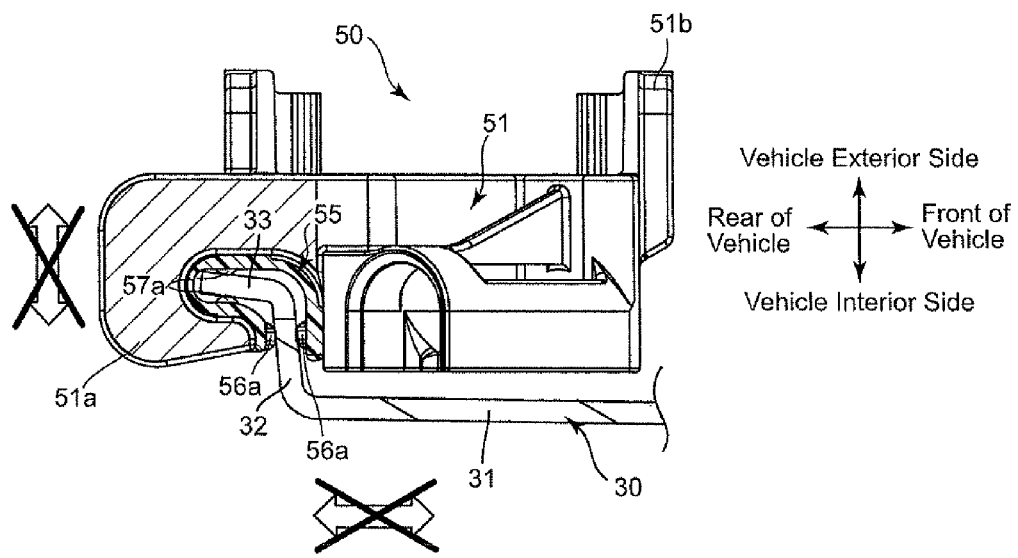
FIG. 9A is a side elevation including a partial cross sectional view corresponding to those of FIGS. 5 and 7, illustrating the support structure of the vehicle-rear-side slider base (the aforementioned one slider base) on the vehicle-rear-side guide rail (the aforementioned one guide rail)

On the rear side of the vehicle, as shown in FIG. 9A, the vehicle-widthwise-directional wall 32 of the guide rail 30 is sandwiched and held between the pair of guide projections 56a of the pair of guide walls 56 of the shoe 55 that is fixed to the slider base 50, so that there is substantially no clearance between the vehicle-widthwise-directional wall 32 of the guide rail 30 and the pair of guide walls 56 (guide projections 56a) of the slider base 50 in the forward/rearward direction of the vehicle (namely, the vehicle-widthwise-directional wall 32 and the pair of guide walls 56 are in contact with each other at all times). The forward/rearward-directional wall 33 of the guide rail 30 is sandwiched and held between the pair of guide projections 57a of the pair of guide walls 57 of the shoe 55 of the slider base 50, so that there is substantially no clearance between the forward/rearward-directional wall 33 of the guide rail 30 and the pair of guide walls 57 (guide projections 57a) of the slider base 50 in the widthwise direction of the vehicle (namely, the vehicle-widthwise-directional wall 33 and the pair of guide walls 57 are in contact with each other at all times). Therefore, the guide rail 30 and the slider base 50 are prevented from moving relative to each other in both the forward/rearward direction and the widthwise direction of the vehicle.

Figure 9B:
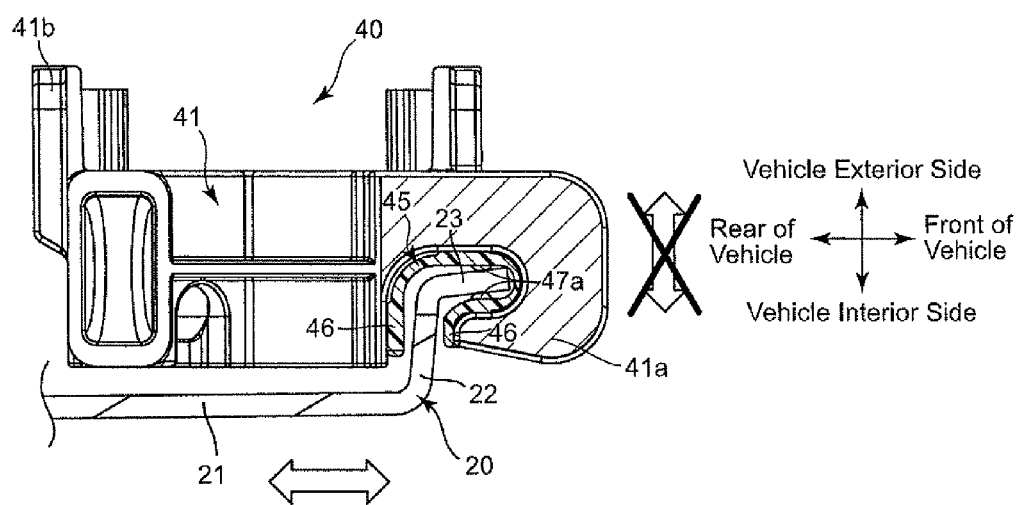
FIG. 9B is a side elevation including a partial cross sectional view corresponding to those of FIGS. 5 and 7, illustrating the support structure of the vehicle-front-side slider base (the aforementioned other slider base) on the vehicle-front-side guide rail (the aforementioned other guide rail)

On the front side of the vehicle, as shown in FIG. 9B, clearance is provided between the vehicle-widthwise-directional wall 22 of the guide rail 20 and the pair of guide walls 46 of the shoe 45 of the slider base 40 in the forward/rearward direction of the vehicle. The forward/rearward directional wall 23 of the guide rail 20 is sandwiched and held between the pair of guide projections 47a of the pair of guide walls 47 of the shoe 45 that is fixed to the slider base 40, so that there is substantially no clearance between the forward/rearward directional wall 23 of the guide rail 20 and the pair of guide walls 47 of the slider base 40 in the widthwise direction of the vehicle (namely, the forward/rearward directional wall 23 and the pair of guide walls 47 are in contact with each other at all times). Therefore, the guide rail 20 and the slider base 40 are prevented from moving relative to each other in the widthwise direction of the vehicle, but are allowed to move relative to each other in the forward/rearward direction of the vehicle due to the formation of the clearance between the vehicle-widthwise-directional wall 22 and the pair of guide walls 46.

As described above, in the present embodiment of the window regulator 1, the clearance between the vehicle-widthwise-directional wall 32 of the guide rail (vehicle-rear-side guide rail/one of the pair of guide rails) 30 and the pair of guide walls (forward/rearward-directional guide walls) 56 of the slider base 50 in the forward/rearward direction of the vehicle is set smaller than the clearance between the vehicle-widthwise-directional wall 22 of the guide rail (vehicle-front-side guide rail/the other guide rail) 20 and the pair of guide walls 46 of the slider base 40 in the forward/rearward direction of the vehicle. This makes it possible to uniformly define the raising and lowering path of the pair of slider bases 40 and 50 (the windowpane 80 (see FIGS. 10 through 12)) by the sliding portions between the vehicle-widthwise-directional wall 32 of the guide rail 30 and the pair of guide walls 56 of the slider base 50, which are small (substantially zero in the present embodiment) in clearance therebetween in the forward/rearward direction of the vehicle, and also makes it possible to eliminate the surface pressures (sliding loads) at the sliding portions between the vehicle-widthwise-directional wall 22 of the guide rail 20 and the pair of guide walls 46 of the slider base 40, which are great in clearance therebetween in the forward/rearward direction of the vehicle, to thereby prevent the sliding portions therebetween from causing malfunctioning and noise thereat even when the pair of guide rails 20 and 30 do not have sufficient parallelism due to a low precision of the shape of the resin panel 10 or the thermal expansion or contraction of the resin panel 10 at the time of production thereof.

Additionally, in the present embodiment of the window regulator 1, as shown in FIGS. 9A and 9B, the clearance between the vehicle-widthwise-directional wall 22 of the guide rail 20 and the pair of guide walls (forward/rearward-directional guide walls) 46 of the shoe 45 of the slider base 40 in the forward/rearward direction of the vehicle is set greater than either of the following two clearances: the clearance between the forward/rearward directional wall 23 of the guide rail 20 and the pair of guide walls (vehicle-widthwise-directional guide walls) 47 of the shoe 45 of the slider base 40 in the widthwise direction of the vehicle and the clearance between the forward/rearward-directional wall 33 of the guide rail 30 and the pair of guide walls (vehicle-widthwise-directional guide walls) 57 of the shoe 55 of the slider base 50 in the widthwise direction of the vehicle. This makes it possible to uniformly define the raising and lowering path of the pair of slider bases 20 and 30 (the windowpane 80) by minimizing the clearance allowing the forward/rearward-directional wall 23 of the guide rail 20 and the pair of guide walls 47 of the slider base 40 (which are not influenced by parallelism of the pair of guide rails 20 and 30) to slide on each other and the clearance allowing the forward/rearward-directional wall 33 of the guide rail 30 and the pair of guide walls 57 of the slider base 50 (which are not influenced by parallelism of the pair of guide rails 20 and 30) to slide on each other, and also makes it possible to eliminate the surface pressures (sliding loads) at the sliding portions between the vehicle-widthwise-directional wall 22 of the guide rail 20 and the pair of guide walls 46 of the slider base 40 to thereby prevent the sliding portions therebetween from causing malfunctioning and noise thereat.

Additionally, in the present embodiment of the window regulator 1, it is possible to achieve a reduction in production cost of the slider bases because portions of the slider bases 40 and 50 which respectively slide on the pair of guide rails 20 and 30 are made of resin (formed as the shoes 45 and 55 that are made of resin in the present embodiment of the window regulator 1).

Additionally, the clearance between the vehicle-widthwise-directional wall 32 of the guide rail 30 and the pair of guide walls 56 of the slider base 50 in the forward/rearward direction of the vehicle can be set small with a simple structure using no extra members because the pair of guide projections 56a, which project toward the vehicle-widthwise-directional wall 32 of the guide rail 30 in the forward/rearward direction of the vehicle. However, this structure is only an example; for instance, a different embodiment is also possible in which the distance between the pair of guide walls 46 of the slider base 40 in the forward/rearward direction of the vehicle and the distance between the pair of guide walls 56 of the slider base 50 in the forward/rearward direction of the vehicle are made to be different from each other without providing guide projections corresponding to the pair of guide projections 56a.

Additionally, the clearance between the forward/rearward-directional wall 33 of the guide rail (vehicle-rear-side guide rail/one of the pair of guide rails) 30 and the pair of guide walls 57 of the slider base 50 in the widthwise direction of the vehicle and the clearance between the forward/rearward directional wall 23 of the guide rail 20 and the pair of guide walls 47 of the slider base 40 in the widthwise direction of the vehicle are set to be substantially identical to each other (these clearances are each set to be substantially zero in the present embodiment of the window regulator). This makes it possible to uniformly define the raising and lowering path of the pair of slider bases 40 and 50 (the windowpane 80 (see FIGS. 10 through 12)) and to prevent the slider bases 40 and 50 from causing malfunctioning and noise.

A method of fixing the pair of glass holders 60 and 70, which hold the windowpane 80, to the pair of slider bases 40 and 50 will be hereinafter discussed with reference to FIGS. 10A through 12B.

Figure 10A:
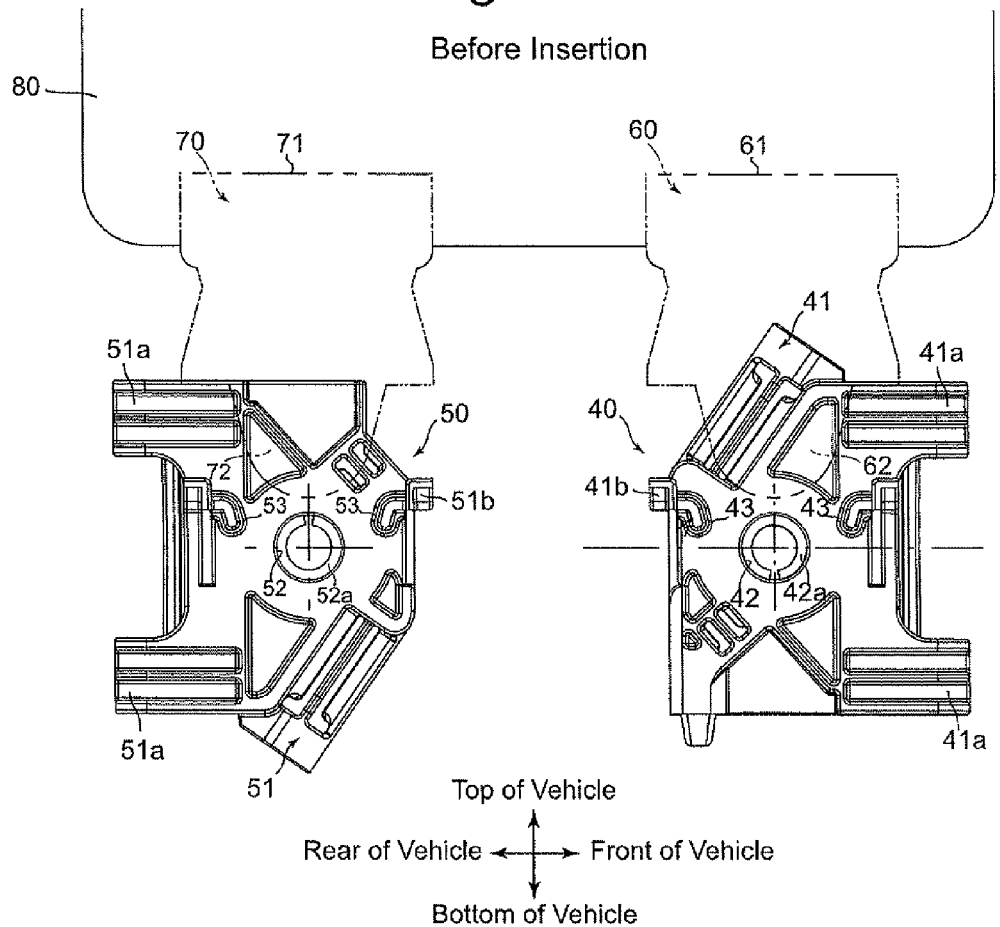
FIG. 10A is a first schematic plan-view, including partial cross sections, for illustrating a method of fixing the pair of windowpane holders that holds a windowpane to the pair of slider bases.
Figure 10B:
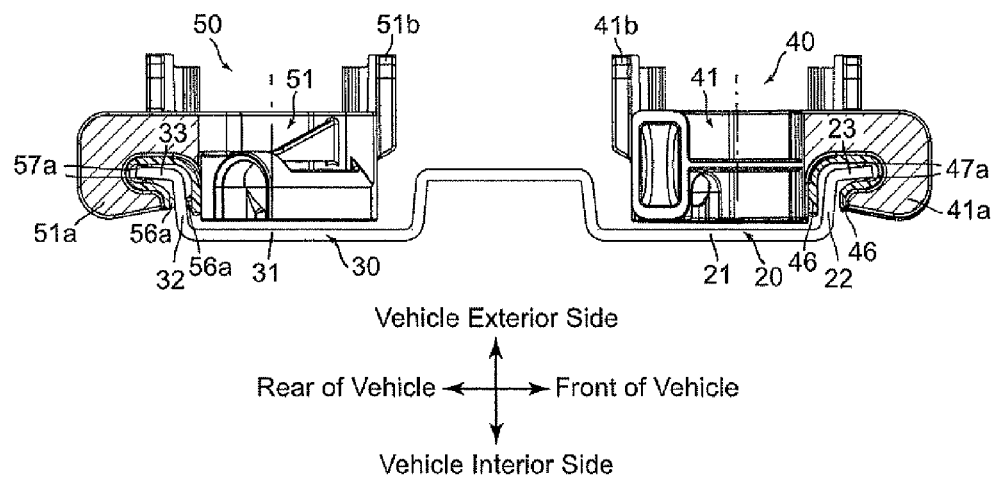
FIG. 10B is a first schematic side-view, including partial cross sections, for illustrating the method of fixing the pair of windowpane holders that holds the windowpane to the pair of slider bases.

FIG. 10A and FIG. 10B illustrate a state before the wedge-shaped portion 62 of the windowpane holder 60 and the wedge-shaped portion 72 of the windowpane holder 70 are inserted into the pair of guide ribs 43 of the slider base 40 and the pair of guide ribs 53 of the slider base 50, respectively. The windowpane 80 is fixed to the windowpane fixing portion 61 of the windowpane holder 60 and the windowpane fixing portion 71 of the windowpane holder 70, and the pitch (distance) between the windowpane holder 60 and the windowpane holder 70 in the forward/rearward direction of the vehicle is predetermined. As shown in FIG. 10B, the slider base 40 and the slider base 50 are supported by the pair of guide rails 20 and 30 thereon to be slidably movable up and down.

FIG. 11A and FIG. 11B illustrate a state in the middle of inserting the wedge-shaped portion 62 of the windowpane holder 60 and the wedge-shaped portion 72 of the windowpane holder 70 into the pair of guide ribs 43 of the slider base 40 and the pair of guide ribs 53 of the slider base 50, respectively. As shown in FIG. 11A, before the wedge-shaped portion 62 and the wedge-shaped portion 72 are inserted into the pair of guide ribs 43 and the pair of guide ribs 53, respectively, a difference can be seen between the pitch (distance) between the windowpane holder 60 and the windowpane holder 70 in the forward/rearward direction of the vehicle and the pitch (distance) between the slider base 40 and the slider base 50 in the forward/rearward direction of the vehicle (specifically, the former pitch (distance) is slightly smaller than the latter pitch (distance). However, as the wedge-shaped portion 62 of the windowpane holder 60 is inserted into the pair of guide ribs 43 of the slider base 40, the slider base 40 moves relative to the guide rail 20 in the rearward direction of the vehicle by utilizing the clearance between the vehicle-widthwise-directional wall 22 and the pair of guide walls 46 in the forward/rearward direction of the vehicle. As shown in FIG. 11B, this accommodates deviations in pitch (compensates pitch tolerance) between the pair of slider bases 40 and 50 and the pair of windowpane holders 60 and 70 in the forward/rearward direction of the vehicle.

Figure 12A:
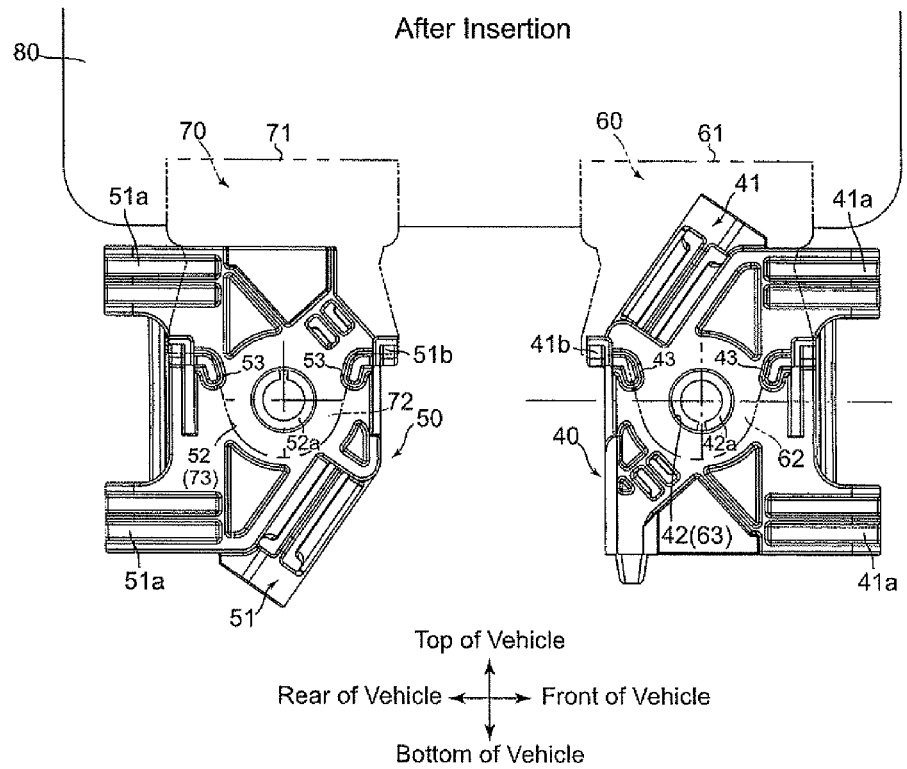
FIG. 12A is a third schematic plan-view, including partial cross sections, for illustrating the method of fixing the pair of windowpane holders that holds the windowpane to the pair of slider bases.
Figure 12B:
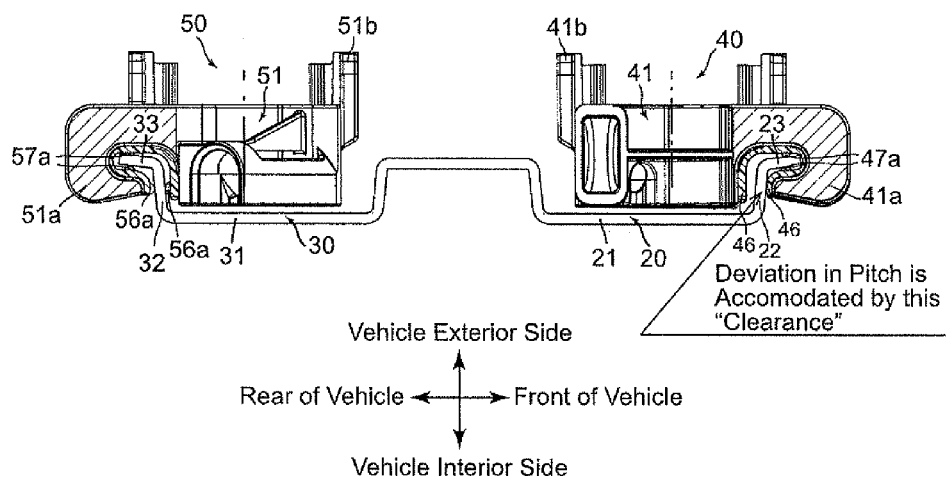
FIG. 12B is a third schematic side-view, including partial cross sections, for illustrating the method of fixing the pair of windowpane holders that holds a windowpane to the pair of slider bases.

FIG. 12A and FIG. 12B illustrate a state after the wedge-shaped portion 62 of the windowpane holder 60 and the wedge-shaped portion 72 of the windowpane holder 70 are inserted into the pair of guide ribs 43 of the slider base 40 and the pair of guide ribs 53 of the slider base 50, respectively. In this state, as shown in FIG. 12A, the pitch (distance) between the slider base 40 and the slider base 50 in the forward/rearward direction of the vehicle and the pitch (distance) between the windowpane holder 60 and the windowpane holder 70 in the forward/rearward direction of the vehicle are mutually (substantially) the same. At the same time, the through-hole 42 of the slider base 40 and the through-hole 63 of the windowpane holder 60 are coaxially aligned and the through-hole 52 of the slider base 50 and the through-hole 73 of the windowpane holder 70 are coaxially aligned. Thereafter, the slider base 40 and the windowpane holder 60 are fixed to each other by a fastening member (fixer) not shown in the drawings, e.g., by inserting a bolt into the through-holes 42 and 63 (specifically into the collar 42a that is fitted into the through-holes 42 and 63) and screwing a nut onto the bolt, and the slider base 50 and the windowpane holder 70 are fixed to each other by a fastening member (fixer) not shown in the drawings, e.g., by inserting a bolt into the through-holes 52 and 73 (specifically into the collar 52a that is fitted into the through-holes 52 and 73) and screwing a nut onto the bolt.

Accordingly, in the present embodiment of the window regulator, the position, which respect to the forward/rearward direction of the vehicle, of a combination of the slider base 50 and the corresponding windowpane holder 70 is defined by the sliding portions between the vehicle-widthwise-directional wall 32 of the guide rail 30 and the pair of guide walls 56 (the pair of guide projections 56a) of the slider base 50, which are small (substantially zero in the present embodiment) in clearance therebetween in the forward/rearward direction of the vehicle, and the position, which respect to the forward/rearward direction of the vehicle, of a combination of the slider base 40 and the corresponding windowpane holder 60 can be adjusted at the sliding portions between the vehicle-widthwise-directional wall 22 of the guide rail 20 and the pair of guide walls 46 of the slider base 40, which have a large clearance therebetween in the forward/rearward direction of the vehicle, thereby accommodating deviations in pitch (compensating pitch tolerance) between the pair of slider bases 40 and 50 and the pair of windowpane holders 60 and 70 in the forward/rearward direction of the vehicle, so that the installation operation of the windowpane 80 becomes easy to perform and the raising and lowering operations of the windowpane 80 can be smoothly performed.

Additionally, the fastening holes (the through-holes 42, 52, 63 and 73) formed in the pair of slider bases 40 and 50 and the pair of windowpane holders 60 and 70 can be circular in shape and mutually identical in diameter and do not have to be formed into elongated holes, which makes it possible to achieve miniaturization of the pair of slider bases 40 and 50 and reduce the work space for fixing (fastening) the pair of windowpane holders 60 and 70 to the pair of slider bases 40 and 50, so that the window regulator 1 can be made advantageous in regard to both weight and production cost.

Additionally, simply by making the pair of guide ribs 43 and the pair of guide ribs 53, which are formed on the pair of slider bases 40 and 50, receive the wedge-shaped portion 62 and the wedge-shaped portion 72, which are formed on the pair of windowpane holders 60 and 70, respectively, the relative position between the pair of slider bases 40 and 50 and the pair of windowpane holders 60 and 70 in the forward/rearward direction of the vehicle can be defined easily and securely without the need for fine adjustment to be made visually carried out by an operator.

In the above illustrated embodiment of the window regulator 1, the relative position between the slider base 40 and the windowpane holder 60 in the forward/rearward direction of the vehicle is defined by fitting the wedge-shaped portion 62 into the pair of guide ribs 43, and the relative position between the slider base 50 and the windowpane holder 70 in the forward/rearward direction of the vehicle is defined by fitting the wedge-shaped portion 72 into the pair of guide ribs 53. Accordingly, in each of the combination of the slider base 40 and the windowpane holder 60 and the combination of the slider base 50 and the windowpane holder 70, the relative position therebetween in the forward/rearward direction of the vehicle has been completed. Alternatively, a different embodiment is shown in FIG. 13, in which the relative position between the pair of slider bases 40 and 50 and the pair of windowpane holders 60 and 70 in the forward/rearward direction of the vehicle is defined by making the pair of slider bases 40 and 50 and the pair of windowpane holders 60 and 70 collaborate with each other is also possible. In this embodiment, the slider base 40 is provided, at two vertically-spaced positions on the vehicle-front side of the through-hole 42, with a pair of guide ribs (positioner/guide portion) 43a, and the slider base 50 is provided, at two vertically-spaced positions on the vehicle-rear side of the through-hole 52, with a pair of guide ribs (positioner/guide portion) 53a. Upon inserting the wedge-shaped portion 62 of the windowpane holder 60 and the wedge-shaped portion 72 of the windowpane holder 70 into the slider body 41 and the slider body 51 along the pair of guide ribs 43a and the pair of guide ribs 53a, respectively, the relative position between the pair of slider bases 40 and 50 and the pair of windowpane holders 60 and 70 in the forward/rearward direction of the vehicle is defined.

Figure 14:
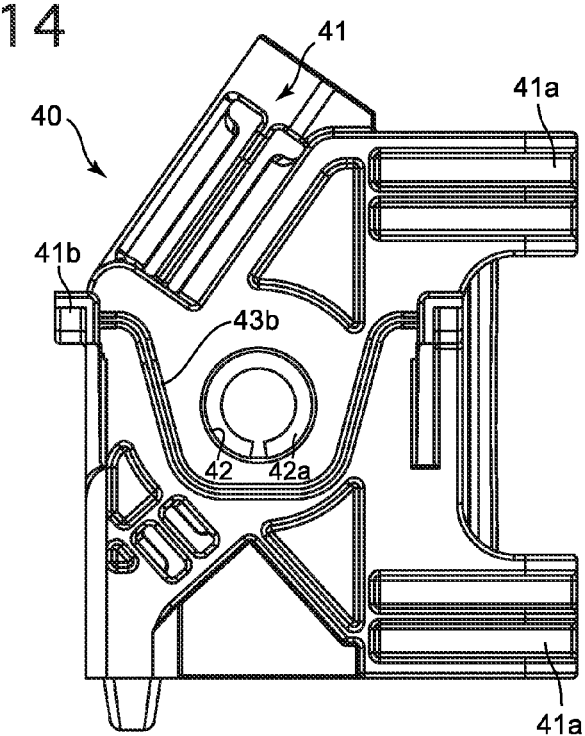
FIG. 14 is a view corresponding to that of FIG. 4, illustrating a modified embodiment of the slider base (the aforementioned other slider base) which uses a U-shaped guide portion instead of a pair of guide ribs.
Figure 15:
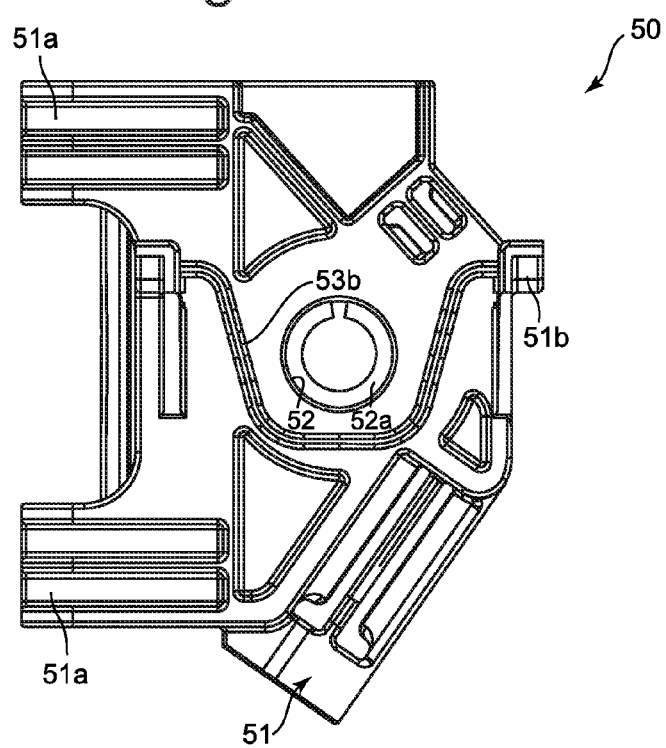
FIG. 15 is a view corresponding to that of FIG. 6, illustrating a modified embodiment of the slider base (the aforementioned one slider base) which uses a U-shaped guide portion instead of a pair of guide ribs.

In each of the above described embodiments of the window regulators, although the window regulator using the pair of guide ribs 43 and the pair of guide ribs 53 (or the pair of guide ribs 43a and the pair of guide ribs 53a) that are respectively formed on the pair of slider bases 40 and 50 has been illustrated as guide portions for defining the relative position between the pair of slider bases 40 and 50 and the pair of windowpane holders 60 and 70 in the forward/rearward direction of the vehicle, some freedom is possible in regard to the shape of the guide portions which are formed on the pair of slider bases 40 and 50. For instance, as shown in FIGS. 14 and 15, the slider base 40 and the slider base 50 can be provided on the slider body 41 and the slider body 51 with a U-shaped guide portion (positioner) 43b and a U-shaped guide portion (positioner) 53b instead of the pair of guide ribs 43 and the pair of guide ribs 53, respectively.

Although the slider base 40 includes the slider body 41 and the shoe 45 and the slider base 50 includes the slider body 51 and the shoe 55 in each of the above illustrated embodiments of the window regulators, each slider base can alternatively be a unitarily-formed component without using a shoe. In such a modified embodiment, each slider base is integrally provided with a pair of guide walls and a pair of guide projections which project from the pair of guide walls, respectively.

Although the resin panel type of window regulator 1, in which the pair of guide rails 20 and 30 are integrally formed with the resin panel 10, has been illustrated above, a different embodiment in which the resin panel 10 is replaced by a metal panel (e.g., an iron-made panel) is also possible. Alternatively, it is also possible for the pair of guide rails to be made of metal as separate members and fixed to a vehicle door panel.

The window regulator 1 that is incorporated in the front right door of a vehicle has been illustrated above as an embodiment of a window regulator according to the present invention. However, the window regulator according to the present invention can also be incorporated in any other door of a vehicle such as the front left door, the rear right door or the rear left door of a vehicle. In addition, the present invention can also be applied to a window regulator incorporated in a back door of a vehicle having a slidable windowpane.

Although the window regular 1, in which the pulleys 11P, 12P, 13P and 14P are respectively supported by the fit-in recessed portions 11, 12, 13 and 14 to be freely rotatable, has been illustrated above as an embodiment of a window regulator according to the present invention, a different embodiment in which irrotatable wire-guiding members instead of the pulleys 11P, 12P, 13P and 14P are respectively supported by the fit-in recessed portions 11, 12, 13 and 14 is also possible.

Although the window regulator 1, in which the collars 42a and 52a are respectively fitted into the through-holes 42 and 52 of the slider bases 40 and 50, has been illustrated above as an embodiment of a window regulator according to the present invention, the collars 42a and 52a can be omitted.

Although the window regulator 1, in which the pair of slider bases 40 and 50 are each provided with a pair of guide ribs 43 or 53, has been illustrated above as an embodiment of a window regulator according to the present invention, the number of guide ribs of each slider base 40 and 50 is not limited to two and can be more than two as long as the guide ribs of the slider base 40 hold the wedge-shaped portion 62 from both sides thereof, with respect to the forward/rearward direction of the vehicle, while the guide ribs of the slider base 50 hold the wedge-shaped portion 72 from both sides thereof, with respect to the forward/rearward direction of the vehicle.

Additionally, the guide ribs formed on each slider base 40 and 50 can be provided as two pairs of guide ribs, i.e., an upper pair of guide ribs and a lower pair of guide ribs which are formed on the vertically opposite sides of the associated through-hole 42 or 52, so that each slider base becomes vertically reversible to be used on either guide rail. This makes it possible to define the relative position between the pair of slider bases 40 and 50 and the pair of windowpane holders 60 and 70 in the forward/rearward direction of the vehicle at each of the combination of the slider base 40 and the windowpane holder 60 and the combination of the slider base 50 and the windowpane holder 70, and also makes it possible to manufacture slider bases having an identical structure at low cost.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A window regulator comprising:
a pair of guide rails which are spaced from each other in a forward and rearward direction of a vehicle and extend in a vertical direction;
a pair of slider bases which are supported by said pair of guide rails to be movable up and down along said pair of guide rails, respectively;
a pair of windowpane holders which are fixed to said pair of slider bases, respectively, and hold a windowpane;
a first positioner which is provided between a first slider base of said pair of slider bases and a first windowpane holder of said pair of windowpane holders, wherein said first positioner defines a relative position between said first slider base of pair of slider bases and said first windowpane holder of pair of windowpane holders in said forward and rearward direction;
a second positioner which is provided between a second slider base of said pair of slider bases and a second windowpane holder of said pair of windowpane holders, wherein said second positioner defines a relative position between said second slider base of said pair of slider bases and said second windowpane holder of said pair of windowpane holders in said forward and rearward direction;
a first vehicle-widthwise-directional wall which is formed on a first guide rail of said pair of guide rails and extends in a widthwise direction of said vehicle;
a second vehicle-widthwise-directional wall which is formed on a second guide rail of said pair of guide rails and extends in a widthwise direction of said vehicle;
a first pair of forward-and-rearward directional guide walls which is formed on said first slider base of said pair of slider bases to hold said first vehicle-widthwise-directional wall therebetween in said forward and rearward direction and to guide said first slider base of said pair of slider bases along said first guide rail of said pair of guide rails; and a second pair of forward-and-rearward directional guide walls which is formed on said second slider base of said pair of slider bases to hold said second vehicle-widthwise-directional wall therebetween in said forward and rearward direction and to guide said second slider base of said pair of slider bases along said second guide rail of said pair of guide rails, wherein a movement clearance in said forward and rearward direction between said second vehicle-widthwise-directional wall of said second guide rail of said pair of guide rails and said second pair of forward and rearward directional guide walls of said second slider base of said pair of slider bases is set smaller than a movement clearance in said forward and rearward direction between said first vehicle-widthwise-directional wall of said first guide rail of said pair of guide rails and said first pair of forward and rearward directional guide walls of said first slider base of said pair of slider bases.

2. The window regulator according to claim 1, wherein said first positioner comprises a first guide portion which is formed on said first slider base of said pair of slider bases, wherein said first guide portion receives said first windowpane holder of said pair of windowpane holders to define said relative position between said first slider base of said pair of slider bases and said first windowpane holder of said pair of windowpane holders in said forward and rearward direction, and wherein said second positioner comprises a second guide portion which is formed on said second slider base of said pair of slider bases, wherein said second guide portion receives the second windowpane holder of said pair of windowpane holders to define said relative position between the second slider base of said pair of slider bases and said second windowpane holder of said pair of windowpane holders in said forward and rearward direction.

3. The window regulator according to claim 2, wherein the first slider base and the second slider base of said pair of slider bases and respective the first windowpane holder and the second windowpane holder of said pair of windowpane holders are fixed to each other by fixers, wherein each of said fixers comprises:
  a first through-hole which is round in shape and is formed through an associated said slider base;
  a second through-hole which is round in shape, has the same diameter as that of said first through-hole, and is formed through an associated said windowpane holder; and
  a fastening member which is inserted into said first through-hole and said second through-hole to fasten said associated slider base and said associated windowpane holder to each other.

4. The window regulator according to claim 3, wherein each said pair of windowpane holders comprises a wedge-shaped portion which narrows in width in said forward and rearward direction of the vehicle in a downward direction, said second through-hole being formed through said wedge-shaped portion, and wherein each of said first and second guide portions comprises at least two guide ribs which hold said wedge-shaped portion of associated one of said pair of windowpane holders from both sides thereof in said forward and rearward direction.

5. The window regulator according to claim 1, wherein said first and second positioners are formed on said first slider base and said second slider base of said pair of slider bases, respectively, and wherein said first and second positioners are formed so that each of said pair of slider bases is vertically reversible to be used on either of said pair of guide rails.

6. The window regulator according to claim 1, further comprising:
  a first forward-and-rearward directional wall which is formed on said first guide rail of said pair of guide rails and is continuous with an end of said first vehicle-widthwise-directional wall thereof on a vehicle exterior side and extends in said forward and rearward direction;
  a second forward-and-rearward directional wall which is formed on said second guide rail of said pair of guide rails and is continuous with an end of said second vehicle-widthwise-directional wall thereof on a vehicle exterior side and extends in said forward and rearward direction;
  a first pair of vehicle-widthwise-directional guide walls which is formed on said first slider base of said pair of slider bases to hold said first forward-and-rearward directional wall therebetween in said widthwise direction and to guide said first slider base of said pair of slider bases along said first guide rail of said pair of guide rails; and
  a second pair of vehicle-widthwise-directional guide walls which is formed on said second slider base of said pair of slider bases to hold said second forward-and-rearward directional wall therebetween in said widthwise direction and to guide said second slider base of said pair of slider bases along said second guide rail of said pair of guide rails, wherein the movement clearance in said forward and rearward direction between said first vehicle-widthwise-directional wall of said first guide rail of said pair of guide rails and said first pair of forward-and-rearward directional guide walls of said first slider base of said pair of slider bases is set greater than each of a movement clearance in said widthwise direction between said second forward-and-rearward directional wall of said second guide rail of said pair of guide rails and said second pair of vehicle-widthwise-directional guide walls of said second slider base of said first pair of slider bases and a movement clearance in said widthwise direction between said forward-and-rearward directional wall of said first guide rail of said pair of guide rails and said first pair of vehicle-widthwise-directional guide walls of said first slider base of said pair of slider bases.

7. The window regulator according to claim 6, wherein said pair of guide rails are formed integral with a panel made of resin.

8. The window regulator according to claim 6, wherein at least part of each of said pair of slider bases which respectively slide on said pair of guide rails are made of resin.

9. The window regulator according to claim 1, wherein each of said pair of slider bases is provided with only one through-hole having a round shape.

10. The window regulator according to claim 9, wherein said first windowpane holder of said pair of windowpane holders is fixed to said first slider base of said pair of slider bases via said through-hole thereof, and said second windowpane holder of said pair of windowpane holders is fixed to said second slider base of said pair of slider bases via said through-hole thereof.

11. The window regulator according to claim 1, further comprising a first forward-and-rearward directional wall that is formed on said first guide rail and is continuous with an end of said first vehicle-widthwise-directional wall thereof to form an L-shape.

12. The window regulator according to claim 1, further comprising
a first pair of vehicle-widthwise-directional guide walls that is continuous with said first pair of forward-and-rearward directional guide walls to form an L-shape within said first slider base.

13. The window regulator according to claim 1, further comprising
a first pair of vehicle-widthwise-directional guide walls that is continuous with said first pair of forward-and-rearward directional guide walls, wherein said first pair of forward-and-rearward directional guide walls extends in a vehicle widthwise direction and said first pair of vehicle-widthwise-directional guide walls extends in a vehicle forward and rearward direction.

* * * * *